United States Patent
Chen et al.

(10) Patent No.: US 8,064,329 B2
(45) Date of Patent: Nov. 22, 2011

(54) CONTROL AND DATA INFORMATION COMMUNICATION IN A WIRELESS SYSTEM

(75) Inventors: Ning Chen, Austin, TX (US); James W. McCoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 758 days.

(21) Appl. No.: 12/142,282

(22) Filed: Jun. 19, 2008

(65) Prior Publication Data

US 2009/0316647 A1    Dec. 24, 2009

(51) Int. Cl.
*H04J 11/00* (2006.01)
*H04W 4/00* (2009.01)

(52) U.S. Cl. .................................. 370/208; 370/330

(58) Field of Classification Search ............... 370/208, 370/330
See application file for complete search history.

(56) References Cited

U.S. PATENT DOCUMENTS

| | | | |
|---|---|---|---|
| 2005/0058104 A1* | 3/2005 | Yomo et al. | 370/335 |
| 2006/0245472 A1* | 11/2006 | Pan et al. | 375/144 |
| 2007/0002724 A1* | 1/2007 | Khan | 370/203 |
| 2007/0053280 A1* | 3/2007 | Uesugi | 370/208 |
| 2007/0162827 A1* | 7/2007 | Walton et al. | 714/774 |
| 2007/0171864 A1 | 7/2007 | Zhang et al. | |
| 2007/0183384 A1 | 8/2007 | Kwak et al. | |
| 2008/0002645 A1* | 1/2008 | Seki et al. | 370/338 |

FOREIGN PATENT DOCUMENTS

JP    EP 1865625    * 12/2007

OTHER PUBLICATIONS

R1-071488, "Uplink Transmission of ACK/NAK Signals," TI, St. Julians, Malta, Mar. 26-30, 2007.
R1-060111, "Uplink Control Signaling for E-UTRA," Ericsson, Helsinki, Finland, Jan. 23-25, 2006.

* cited by examiner

*Primary Examiner* — Ronald Abelson
(74) *Attorney, Agent, or Firm* — David G. Dolezal; Ranjeev Singh

(57) ABSTRACT

A method of transmitting data information and control information is provided. The method includes encoding the control information and encoding the data information. The method further includes modulating the control information and modulating the data information. The method further includes spreading the modulated control information using a spreading code to generate spread control information. The method further includes superimposing the spread control information with the modulated data information. The method further includes transmitting the modulated data information with the superimposed spread control information.

5 Claims, 5 Drawing Sheets

CONTROL AND DATA INFORMATION COMMUNICATION IN A WIRELESS SYSTEM

BACKGROUND OF THE INVENTION

1. Field of the Invention

This invention relates in general to the wireless communication of information and more specifically to the communication of control and data information.

2. Description of the Related Art

Wireless communication systems such as cellular networks and wireless LAN systems communicate information between wireless communication devices such as e.g. cellular phones, wireless PDAs, and computer systems with wireless capability. The information communicated includes both data information and control information. Data information includes information that applications of the wireless communication devices desire to exchange with other communication devices. Examples of data information include data information for voice, text messages, emails, images, web pages, and other applications.

In order to exchange data information, control information needs to be exchanged between devices communicating over a wireless link. For example, scheduling information, quality information, and acknowledgement information are transmitted to facilitate the exchange of data information over a wireless link.

What is needed is an improved system for communicating control and data information in a wireless communication system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Figure 1:
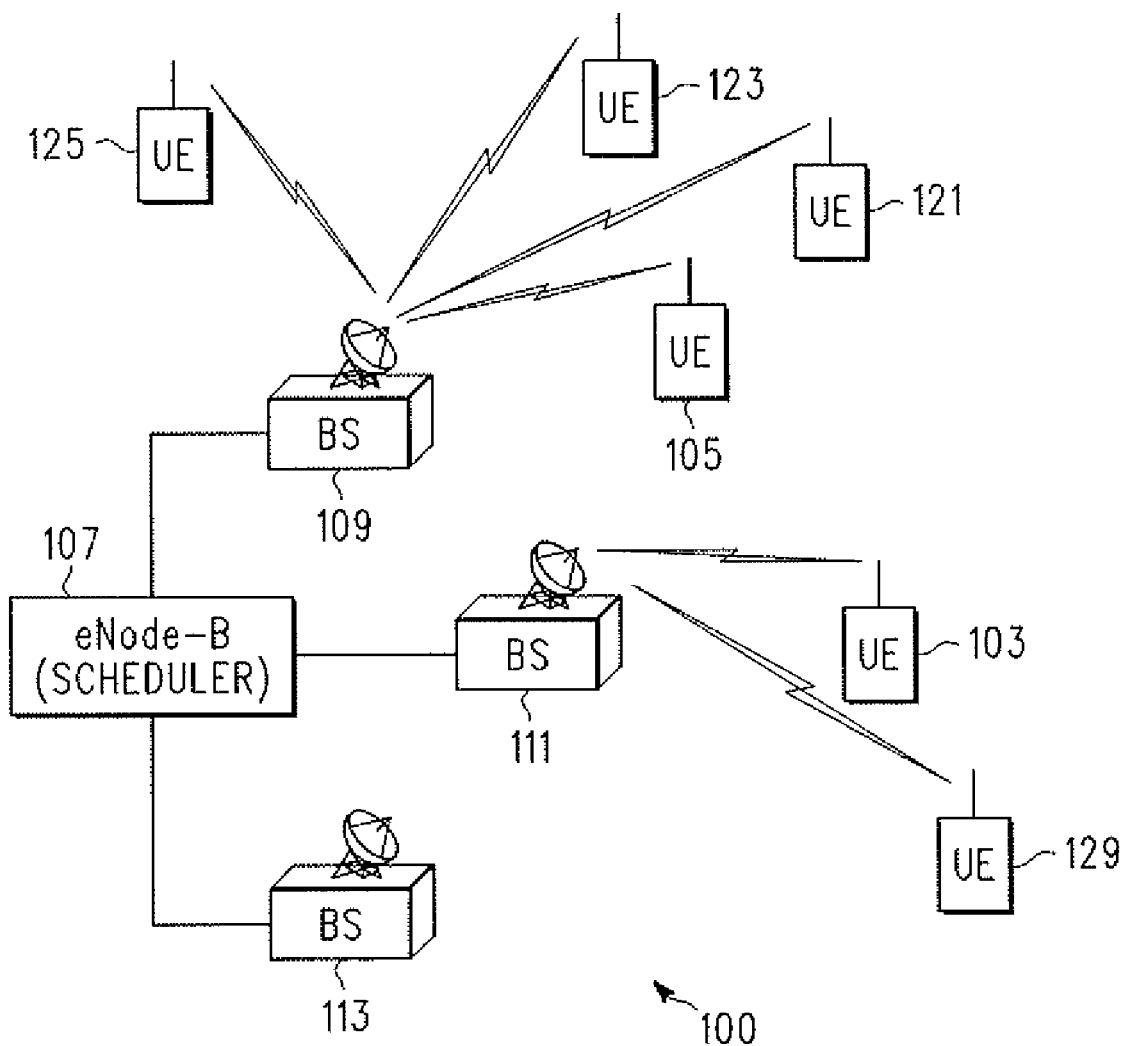
FIG. 1 is a block diagram of a wireless communication system according to one embodiment of the present invention.

FIG. 1 is a block diagram of a communication system according to one embodiment of the present invention. In the embodiment shown, system 100 is a cellular telephone network that includes a number of base stations 109, 111, and 113 communicatively coupled to an eNode-B scheduler 107. Scheduler 107 provides control and data information to the base stations for transmission to the user equipments (UE) (e.g. 121, 123, 125) communicatively coupled via a wireless link to the base station. For example, UEs 105, 121, 123, and 125 are each communicatively coupled to base station 109. Each UE transmits data and control information which is transmitted back to scheduler 107. In one embodiment, the information is forwarded by scheduler to the base station of the UE for which the information is intended, or the scheduler may forward the information to other schedulers to be provided to the intended UE.

In one example, the UE is a cellular phone, but may be of other types of wireless devices (e.g. a wireless PDA, computer system) in other embodiments. Also in other embodiments, the communication system 100 may be another type of wireless communication system e.g. a wireless LAN such as a WiMAX system.

In the embodiment shown, a downlink channel is a wireless channel of a wireless link where information is transmitted from the base station to the UE. The uplink channel is a wireless channel where information is transmitted from the UE to the base station.

In one embodiment of the wireless system, information is transmitted between communication devices in a subframe. A subframe occurs at a specific time slot and includes a particular frequency band (which maybe contiguous or non contiguous). In one embodiment, the base station transmits information in a subframe to the UEs in its cell. The subframe may contain information for specific UEs. Such information is transmitted orthogonally in some way from other information intended for other UEs such that it can be distinguished from the other information.

In the embodiment shown, each UE transmits information to the base station by an uplink channel at a specific time slot and at a particular carrier frequency or frequencies. A number of UEs may transmit information to a base station during a subframe where the information transmitted by each UE is orthogonal in a particular way from the information transmitted by the other UEs.

Figure 2:
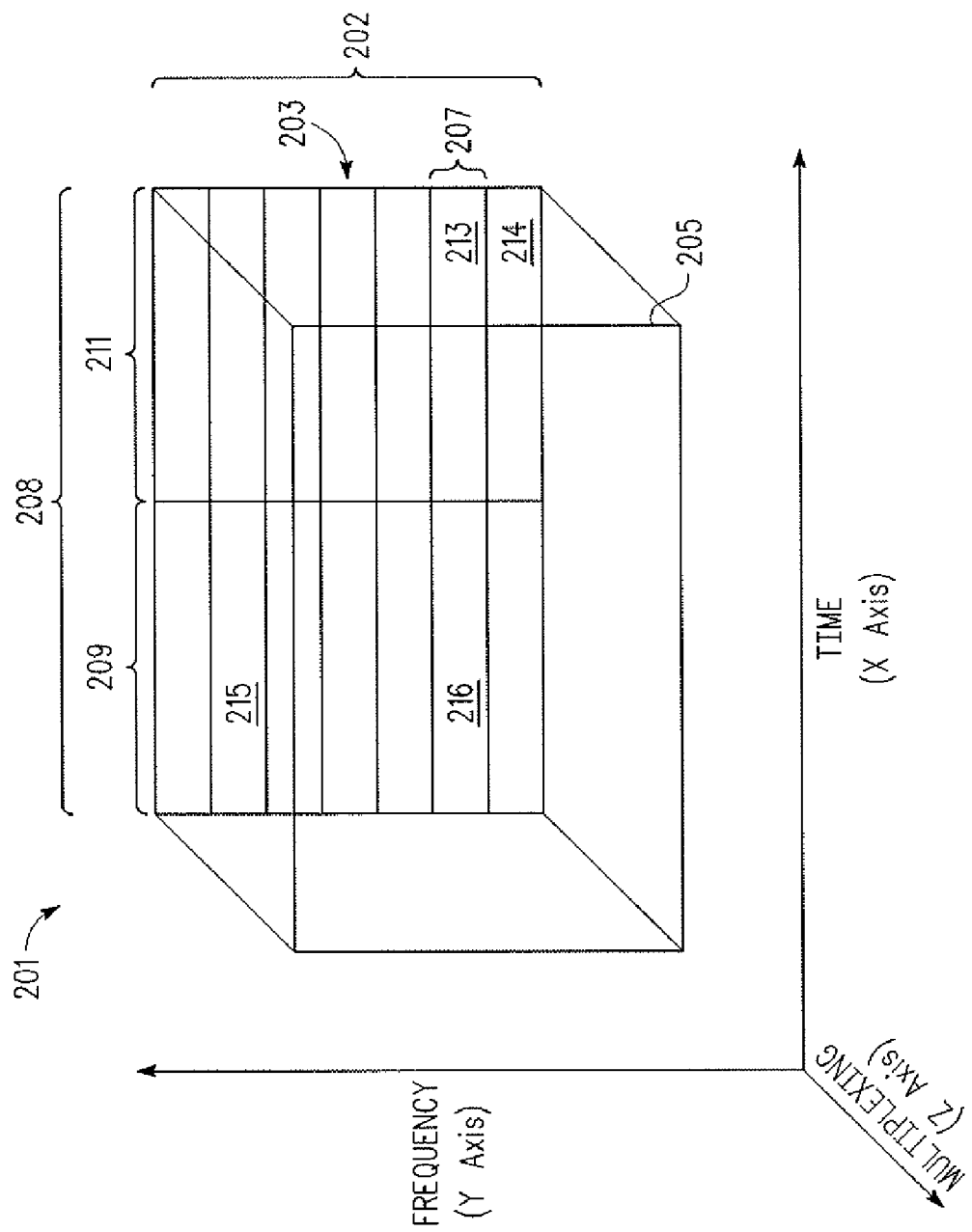
FIG. 2 is a graphical representation of a subframe of information to be transmitted in a wireless communication system.

FIG. 2 is a graphical representation of an uplink subframe 201 according to one embodiment of the present invention. Subframe 201 occurs over a predetermined time period 208 (the X axis) and is conveyed by a number of frequencies referred to as the system frequency bandwidth 202 (the Y axis). In the embodiment shown, subframe 201 includes two multiplexing planes (in the Z direction) (e.g. plane 203 and plane 205). Each multiplexing plane represents information that is multiplexed by a different multiplexing scheme. In one embodiment, multiplexing plane 203, represents information that is transmitted in an orthogonal frequency division multiplexing (OFDM) scheme and plane 205 represents information that is transmitted in a code division multiplexing (CDM) scheme.

With an OFDM scheme, information is transmitted in resource blocks where each resource block includes information transmitted at a particular time slot and over a specific subset (subband) of subcarrier frequencies (either contiguous or non contiguous). In the embodiment shown, subframe 201 includes two time slots 209 and 211 and seven subcarrier frequency subbands (e.g. 207) located in system bandwidth 202. In one embodiment, each subcarrier frequency subband includes 12 subcarrier frequencies (which may be contiguous or non contiguous). A resource element is the information conveyed by one subcarrier frequency over a symbol time period of one time slot. In one example, each time slot has 7 symbol time periods. For example, 84 (7×12) resource elements are conveyed every symbol period in subframe 201. In such an example, 588 (84×7 symbol periods per time slot) resource elements are convey in the subframe during one time slot.

A resource block is a block of resource elements conveyed by the 12 subcarrier frequencies of a subband over one time slot. Each resource block within a time slot is orthogonal in frequency to the other resource blocks of the same time slot. For example, resource block 213 is orthogonal in frequency to resource block 214 in that they have different frequency subcarriers.

The resource blocks that occur within the same subcarrier frequency band but at different time slots are considered orthogonal in time to each other. For example, resource blocks 216 and 213 which occur in subcarrier frequency band 207 are orthogonal in time to each other in that they occur in a different time slot. An information unit is considered orthogonal to another information unit with respect to a particular characteristic if those units do not share the same resources of that characteristic.

An OFDM plane of other embodiments may have different resource allocation configurations. For example, a subframe may have a greater number of time slots, a different number of subcarrier frequency bands, a different number of symbol time periods per time slot, and/or a different number of sub carriers per subcarrier frequency band.

With a code division multiplexing (CDM) scheme, each information unit has it own spreading code that is unique to other spreading codes of the scheme. An information unit is code orthogonal with another information unit if it has a different spreading code than the other unit. In some embodiments, code orthogonal information units may share frequencies and time resources with each other during transmission. In one embodiment, the spreading code used is a set of Zadoff-Chu based codes. Other embodiments may use other spreading codes such as a Walsh code. However, Zadoff-Chu based codes may be preferable for superimposition with an OFDM multiplexing scheme in that Zadoff-Chu based codes have zero autocorrelation in both time and frequency domain. In some embodiments, other types of codes having zero autocorrelation in both the time and frequency domain or having zero autocorrelation in the time domain.

In the embodiment shown, information conveyed in plane 205 is conveyed with shared frequencies and time with different spreading codes. However, in other embodiments, some of the information units conveyed in plane 205 may be grouped into separate time slots and/or subcarrier frequency bands. See the discussion below with respect to FIG. 6.

In one embodiment, data information from each UE is conveyed to a base station in resource blocks of subframe 201 in plane 203 and control information is conveyed in information units of plane 205. In one embodiment, each UE is assigned one or more resource blocks (e.g. 215) of plane 203 for transmitting data information to a base station. In one embodiment, each UE is assigned a resource block of each time slot, wherein the resources blocks for a UE may be in the same or different subcarrier frequency subband in the different time slots.

In one embodiment, the control information includes ACK and NAK signals, channel quality information (CQI), hybrid ARQ redundancy version information, transport format information, channel feed back information, and multiple input multiple output (MIMO) feedback information. However, other types of control information maybe transmitted in plane 205.

In some embodiments, some control information may be transmitted in plane 203. Also, in some embodiments, data information may be transmitted in plane 205.

In one embodiment, the transmission rate of information in plane 203 is much greater than in plane 205. In one embodiment, plane 203 has an information rate of 50 Mbits per second and plane 205 has an information rate of 1 Mbits per second. However, other embodiments may include other information rates each for plane 203 and 205.

In one embodiment, each subframe is one millisecond long and occurs every 20 milliseconds. However, in other embodiments, the subframes may be at different lengths and/or different times.

Figure 3:
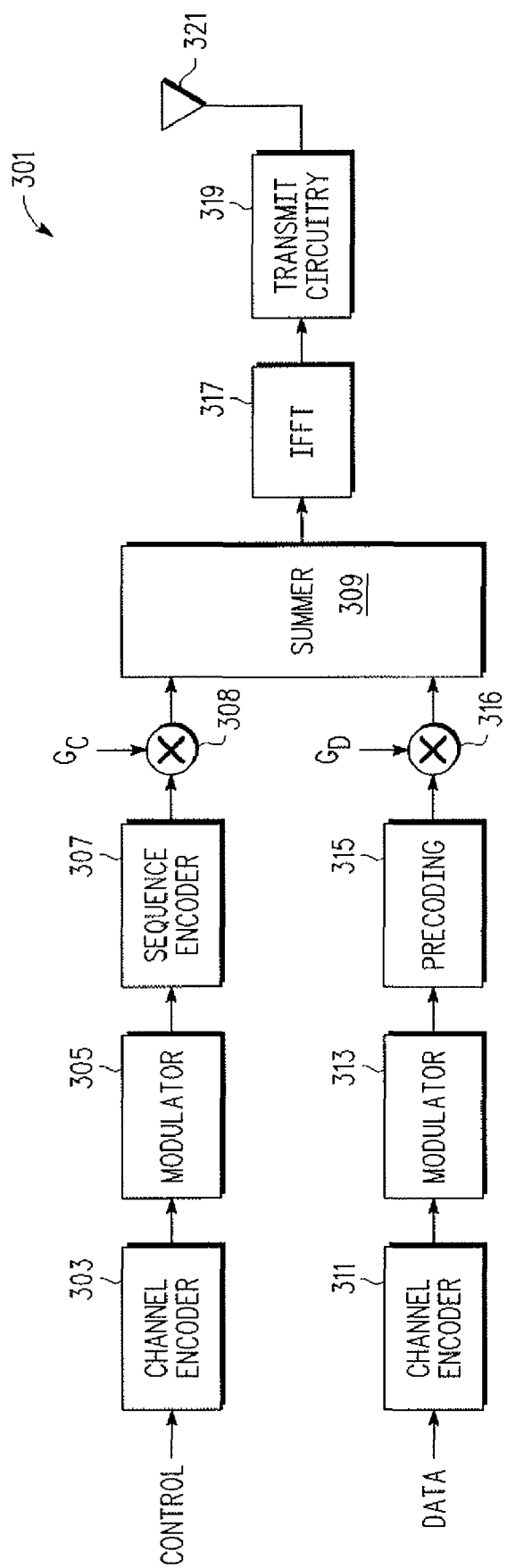
FIG. 3 is a block diagram of a portion of a transmitter according to one embodiment of the present invention.

FIG. 3 is a block diagram of a portion of a transmitter circuit that is located in an UE for transmitting information in an OFDM plane (e.g. 203) and information in a CDM plane (e.g. 205). In one embodiment, the modules shown maybe implemented in one or more integrated circuits of a wireless communication device. The modules may be implemented in hardware, implemented in software modules executed by a processor (e.g. a base band processor or digital signal processor), or in a combination of the two.

Transmitter 301 includes two inputs, one for receiving control information and another for receiving data information. The control and data information may be received in some embodiments from processing circuitry or other type of circuitry (not shown) of a communication device. The data information is encoded by a channel encoder 311. In one embodiment, encoder 311 performs an encoding scheme on the data such e.g. turbo encoding, convolutional encoding, or block encoding.

The output of channel encoder 311 is provided to modulator 313. In one embodiment, modulator 313 modulates the encoded data information to map the input binary stream of encoded data information to a set of complex constellations. In one embodiment, modulator 313 is a quadrature amplitude modulator (QAM), but may be of another type of modulator (e.g. binary phase shift key (BPSK)) in other embodiments.

The output of modulator 313 is provided to a precoder module 315. In one embodiment, precoding module performs discrete Fourier transforms that transforms the modulated complex symbols into a frequency domain complex sequence. In some embodiments, an identity matrix may be utilized as a transforming matrix in precoder module 315.

Control information is encoded by channel encoder 303. Encoder 303 may utilize the same encoding scheme or a different encoding scheme as encoder 311. The encoded control information is providing to modulator 305 which modulates the information as per a modulation scheme. In one embodiment, the modulation scheme of modulator 305 is similar to that of modulator 313, but may be different in different embodiments.

The modulated output of modulator 305 is provided to sequence encoder 307. Sequence encoder 307 spreads the modulated encoded control information using a assigned spreading code to implement code division multiplexing of the control information. In one embodiment, sequence encoder 307 spreads the control information using an assigned ZC (Zadoff-Chu) based code. However, encoder 307 may use other sequences in other embodiments.

The outputs of encoder 307 and precoder module 315 are weighted by gain factors $g_c$ and $g_d$ via multipliers 308 and 316, respectively. These gain factors are used for power control of the output of transmitter 301 to control multi-user interference in a wireless communication system.

Transmitter 301 includes a summer module 309 that superimposes the control information from multiplier 308 with the data information from multiplier 316 to provide a composite signal that represents data and control information of the different planes superimposed for transmission. In one embodiment, summer module 309 combines the control and data information as per a granted schedule (e.g. from scheduler 107) such that the control and data channels of an uplink subframe may be mapped onto the same time and frequency resources of the subframe.

The composite signal is provided to an inverse fast Fourier transform (IFFT) module 317 which transforms the output of summer module 309 into a time domain data sequence. The output of IFFT module 317 is provided to transmit circuitry where it is transmitted via antennae 321 at its designated frequency carriers and time slots of a subframe. In one embodiment, the information is transmitted as per single carrier frequency division multiple access (SC-FDMA) multiplexing scheme.

Other embodiments of a transmitter may have other configurations including other types of modules, have different arrangements of the modules, and have modules performing their functions in a different manner and/or performing different operations on the information.

Figure 4:
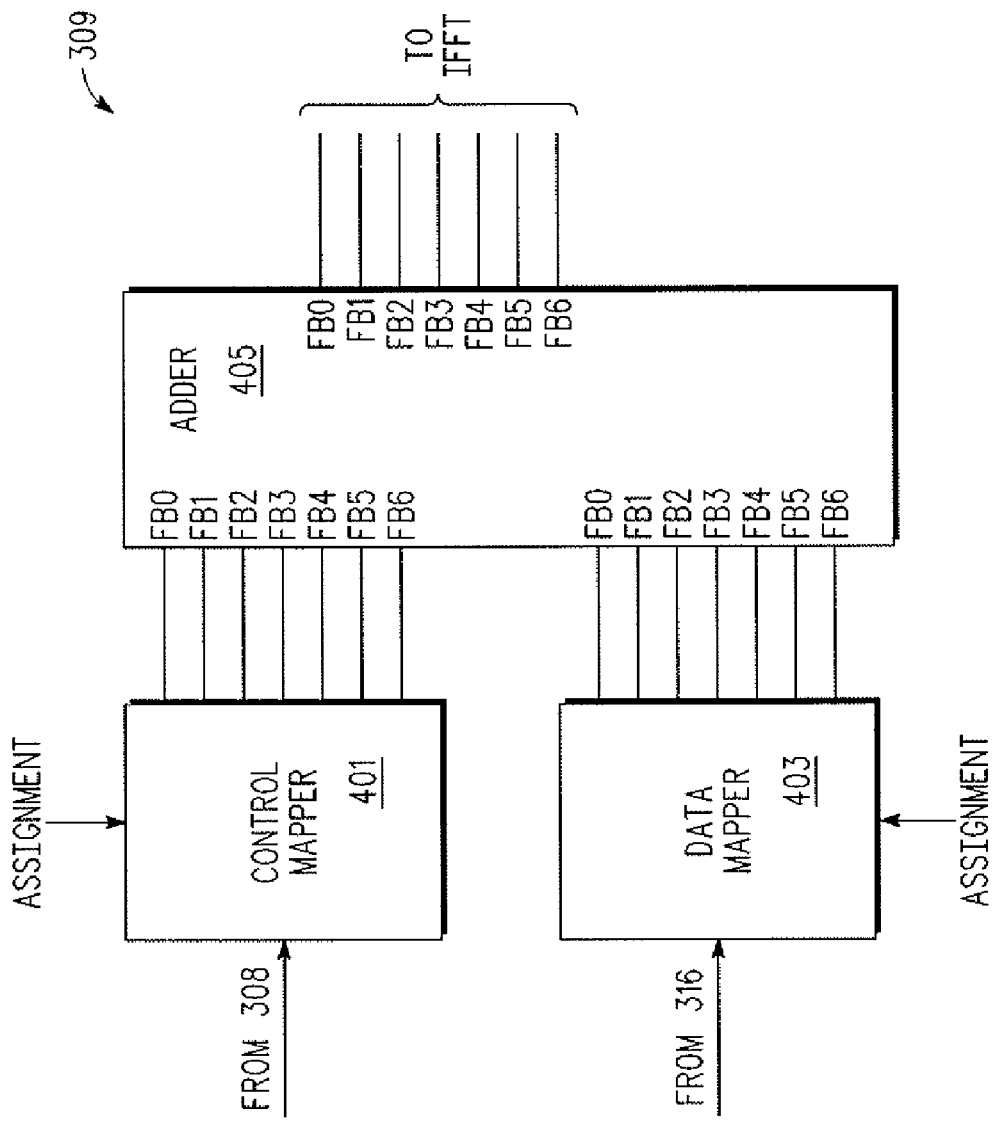
FIG. 4 is a block diagram of a summer according to one embodiment of the present invention.

FIG. 4 is a block diagram of one embodiment of summer module 309 of FIG. 3. Summer module 309 includes a control mapper 401 which receives the control information that has been spread by a spreading code. In the embodiment shown, mapper 401 provides a digital complex value for each subcarrier frequency of a frequency subband (FB0-FB6) of a symbol period in a subframe. In FIG. 4, the complex values for the subcarrier frequencies of each subband is represented by one line. In one embodiment, the specific code sequence is provided by the eNode-B scheduler. In one embodiment, mapper 401 receives assignment information where the control information is not spread across all resource blocks and time slots of a subframe. For those symbol periods in which the control information is not assigned, zero values would be provided by mapper 401. This assignment information is provided by the eNode-B scheduler in one embodiment. This mapping is performed by hardware, software or a combination thereof.

Summer module 309 also includes a data mapper 403 for mapping the received data information for an OFDM multiplexing scheme. Data mapper 403 maps the digital complex values of the data information to provide complex values for each subcarrier frequency per symbol period of a subframe. Data mapper 403 receives an assignment signal generated by the eNode-B scheduler for assigning the data information to one or more resource blocks of a subframe. Data mapper 403 then maps the data to provide complex values for each subcarrier frequency of the assigned resource block(s) for each symbol period of the time slot of the assigned resource block (s). In one embodiment, zero values are provided by mapper 403 for those subcarrier frequencies of resource blocks of a sub frame not assigned to the UE. In FIG. 4, each line represent the complex values for the subcarrier frequencies of each subband.

In one embodiment, the eNode-B scheduler assigns the resource blocks for the data information independently from the resource assignment of the control information.

For each symbol period and for each subcarrier frequency, adder 405 adds the complex value for each subcarrier frequency from the mapper 401 with the corresponding complex value for the subcarrier frequency from mapper 403 to produce a superimposed complex value for that sub carrier frequency and symbol period. These complex values are in the digital domain. Each output line of adder 405 represents the superimposed complex values for the subcarrier frequencies of a subband.

Summer module 309 may have different configurations and/or may perform superimposition of the control information and data information differently. In one embodiment, the control information and the data information may be added first and then mapped to a particular frequency subband.

Figure 5:
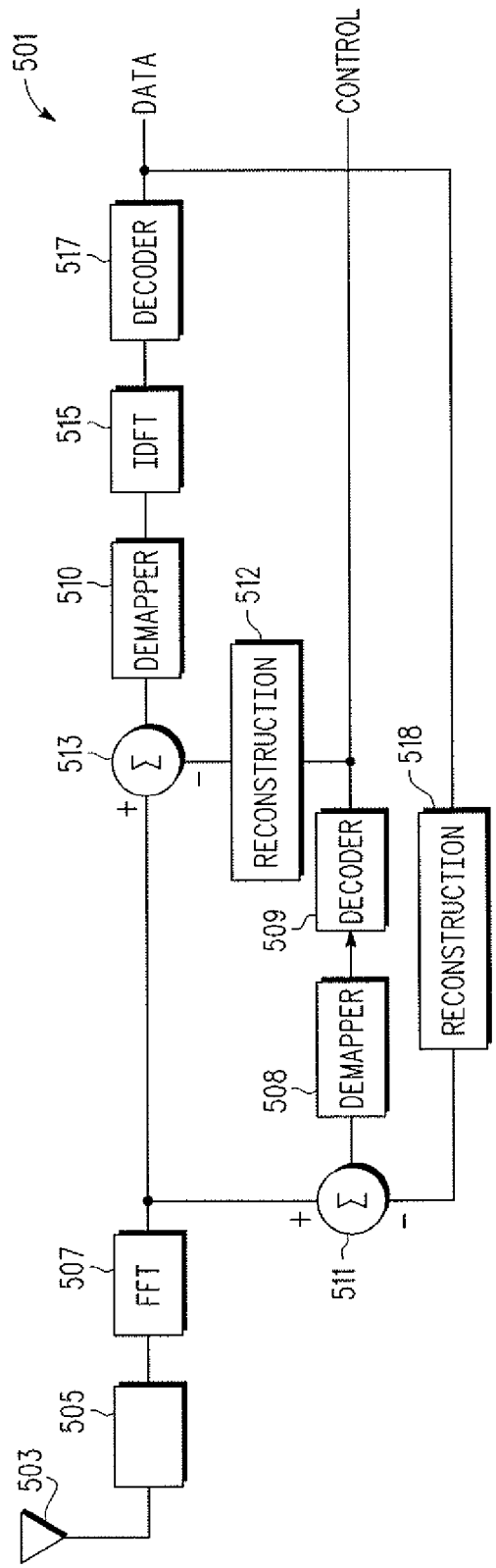
FIG. 5 is a block diagram of a receiver according to one embodiment of the present invention.

FIG. 5 is a block diagram of one embodiment of a portion of a receiver of a wireless communication device. In one embodiment, receiver 501 is located in a base station for receiving information from UEs in the base station's cell. In one embodiment, the modules shown in FIG. 5 maybe implemented in one or more integrated circuits of a base station. The modules may be implemented in hardware, implemented in software modules executed by a processor (e.g. a base band processor or digital signal processor), or in a combination of the two.

Receiver 501 includes an antennae 503 for receiving wireless signals. Receiving circuitry 505 down converts the signals received from antenna 503 from RF frequencies to base band frequencies and converts the signals to a digital domain. In one embodiment, the output of circuitry 505 is a complex valued, digital sample stream in the time domain. Fast Fourier Transform module 507 converts the complex valued sample stream to the frequency domain. In one embodiment, the output of module 507 is a number of complex values where each complex value represents the information received on a subcarrier frequency during a symbol period. The information of the complex values includes the information received from multiple UEs transmitting during the symbol period.

The output of FFT module 507 is provided to summer 511 where a feed back signal (digital complex values) is subtracted from the output of FFT module 507 and provided to demapper 508. Demapper 508 demaps the frequency domain control information for each subgroup of UEs to separate that information from the control information of other subgroups of UEs. The control information for each subgroup is orthogonal in either time or frequency from the control information of other subgroups of UEs. For example, in the embodiment of FIG. 6, demapper would separate the control information for UEs 1-6, UEs, 7-12, UEs 13-18, and UEs 19-24 in that the information of each of these UE subgroups is orthogonal in either time and/or frequency with respect to the control information of the other subgroups. Demapper 508 would include an output for each subgroup of UEs. The control information for each UE in a subgroup is code orthogonal with respect to the other UEs of the subgroup but is not orthogonal in time or frequency with respect to those UEs. Some embodiments would not include demapper 508 where the control informational of each UE is spread over the entire frequency system bandwidth.

Decoder 509 decodes the demapped frequency domain control information for each sub group of UEs to generate the control information for each UE. In one embodiment, decoder 509 despreads the frequency domain control information sequences using the spreading codes of the transmitting UEs. In one embodiment, decoder 509 includes a sequence decoder, a demodulator, and a channel decoder. Decoder 509 provides the control information for each UE transmitting in the subframe.

The output of FFT module 507 is provided to summer 513 for removal of reconstructed control information from the CDM plane information. This reconstructed information is provided by reconstruction module 512. Module 512 receives the control information from decoder 509 and encodes, modulates, spreads the information, and provides gain (similar to encoder 303, modulator 305, sequence encoder 307, and gain multiplier 308) to provide an estimate of the complex values representing the control information received from the CDM plane. These estimated values are subtracted from the output of FFT module 507 to provide a more accurate estimation of the complex values of the data information.

The output of summer 513 (one output for each UE) is provided demapper 510. Demapper 510 demapps the data information for each UE that was transmitted during that time slot. This information is then provided to the inverse discrete Fourier transform (IDFT) module 515 to generate time domain data sequences for the data information for each UE. In one embodiment, module 515 performs an inverse discrete Fourier transform. Decoder 517 decodes (including demodulation and channel decoding) the time domain data sequences to decoded data information for each UE.

In the embodiment shown, the output of decoder 517 is provided to reconstruction module 518 to reconstruct the OFDM plane complex values corresponding to the data information for its removal from the output of FFT module 507 by summer 511. The reconstructed data information is used to remove the contributions of the OFDM plane (data information) that occur at the same time and frequencies as the control information of the CDM plane. Some embodiments do not include this feedback signal to summer 511. In the embodiment shown, reconstruction module 518 performs the same operations on the data information as channel encoder 311, modulator 313, precoder module 315, and multiplier 316 to reconstruct the OFDM plane.

In other embodiments, the feedback loop may be coupled to other devices in the data information path. For example, the output of IDFT module 515 may be coupled to the input of reconstruction module 518, thereby reducing the complexity of module 518. However a more accurate system may be obtained where the data information is reconstructed from the output of decoder 517.

In the embodiment shown, the control information from the CDM plane is decoded and then reconstructed to be removed from the data information from the output of module 507 by summer 513 to more accurately separate the information of the different multiplexing planes. Also in the embodiment shown, the decoded data information of the OFDM plane is reconstructed to be subtracted from the output of FFT module 507 by summer 511 to more accurately remove the data information from the control information. Although FIG. 5 shows only one such iteration of feedback of one plane's reconstructed information for removal from the other plane's information, other embodiments may include configurations for multiple iterations of one plane's reconstructed information removal from the information of the other to improve the performance of the system. In some embodiments, these iterations would be performed on the information until the information meets a certain performance criteria. In other embodiments, a predetermined number of iterations would be performed.

Figure 6:
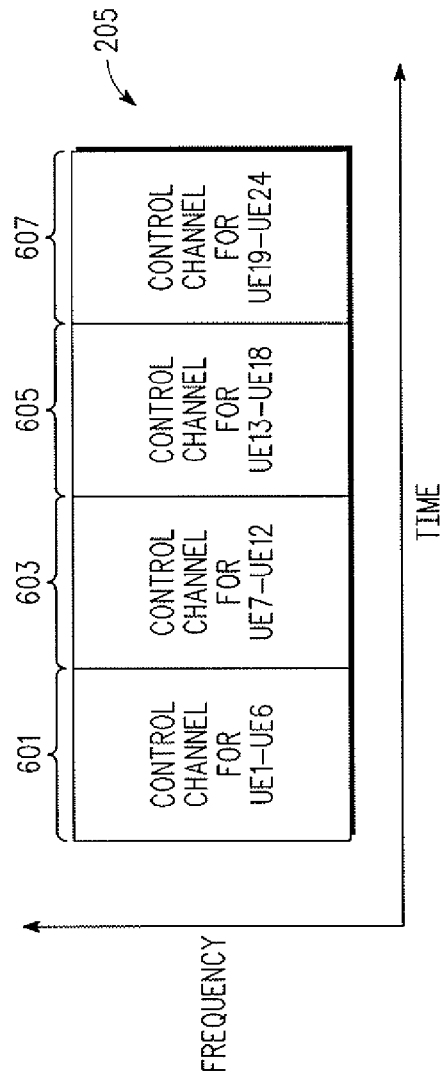
FIG. 6 is a graphical representation of a control information arrangement in a subframe according to another embodiment of the present invention.

FIG. 6 shows an alternative embodiment for CDM plane 205 of FIG. 2. In the embodiment of FIG. 6, the control information for the different UEs are sub grouped into different time slots where the information is spread across all subcarrier frequencies of plane 205 of subframe 201. In the embodiment shown, UEs UE1-UE6 transmit control information in time slot 601 across all subcarrier frequency subbands, with the control information from each UE is transmitted with a code orthogonal to the control information of the other five UEs. Likewise, the control information from UEs 7-12 are transmitted in time slot 603, the control information from UEs 13-18 are transmitted in time slot 605, and the control information from UEs 19-24 are transmitted in time slot 607.

The control plane 205, may have other configurations in other embodiments. For example, in one embodiment, the codes for each subgroup of UEs may be spread within a specific subcarrier frequency subband across all time slots of a subframe. The subcarrier frequency band for a UE's group's control information may be the same or different from the subcarrier frequency band of resource blocks in the OFDM plane 203 for that UE.

Although the preceding embodiments describe an uplink subframe with both OFDM and CDM plane, a down link frame may also include both an OFDM plane and CDM plane as well.

Implementing a system that includes subframes having data transmitted in an OFDM (or other multiplexing scheme) plane and control information transmitted on a CDM plane using the same time-frequency resources provides for a system that allows for a greater time-frequency allocation for the information. With past control/data information transmission schemes, time and/or frequency orthogonal resources had to be dedicated for the control information. For example, with some past schemes, certain subcarrier frequency bands or time slots were reserved for control information. With embodiments of the present application, such control information reservation schemes may be eliminated or reduced (the amount of OFDM resources for the control information may be reduced), thereby increasing the amount of data information provided in a subframe.

For a UE that is not transmitting at the edge of a base station cell, the superimposed CDM plane has a minimal cost. For such non edge UE's, the increase in transmission power for the CDM plane does not affect the information rate transfer in that such non edge cell UEs are not power constrained. In some embodiments, power constrained UEs may only transmit data or control information in a subframe due to the excess power requirements of transmitting both planes.

In the embodiments described, control information is transmitted in the CDM plane and data information is transmitted in the OFDM plane. However, in other embodiments, different types of information could be transmitted in each plane. In one embodiment, these different information types would be at different information rates. For example, in one embodiment, text or image data information may be transmitted in the OFDM plane at a higher information rate and voice data information may be transmitted in the CDM plane at lower data rates. In this way, voice data information and text or image information could each share the same time/frequency resources without limiting those resources. Also in other embodiments, the information transmitted in plane 203 may be transmitted by another multiplexing scheme such as spatial multiplexing.

In one embodiment, a method of transmitting data information and control information includes encoding the control information, encoding the data information, modulating the control information to generate modulated control information, modulating the data information to generate modulated data information, spreading the modulated control information using a spreading code to generate spread control information, and superimposing the spread control information with the modulated data information to generate superimposed information. The modulated data information is not code spread. The method includes transmitting the superimposed information.

Another embodiment includes a method of transmitting a first type of information and a second type of information by a user equipment. The method includes spreading a first type of information as per a code division multiplexing scheme to generate spread information. The first type of information includes a first plurality of complex values. The method includes generating a second type of information wherein the second type of information is not code spread. The second type of information includes a second plurality of complex values. The method includes superimposing the spread information with the second type of information to generate superimposed information and transmitting the superimposed information on a wireless link.

In another embodiment, a method of receiving data information and control information includes performing a fast-Fourier transform on a received complex valued sample stream to generate a transformed complex valued sample stream and decoding the control information in the transformed complex valued sample stream to generate decoded control information. The decoding includes code de-spreading the control information. The method includes reconstructing the decoded control information. The reconstructing includes spreading the decoded control information as per a code division multiplexing scheme to generate reconstructed spread information. The method includes subtracting the reconstructed spread information from the transformed complex valued sample stream to generate a frequency domain data information sequence. The method also includes performing an inverse discrete-Fourier transform on the frequency domain data sequence to generate a time domain data sequence and decoding the time domain data sequence to generate decoded data information.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of receiving data information and control information, comprising:

performing a fast-Fourier transform on a received complex valued sample stream to generate a transformed complex valued sample stream;
  decoding the control information in the transformed complex valued sample stream to generate decoded control information, wherein the decoding includes code de-spreading the control information;
  reconstructing the decoded control information, the reconstructing including spreading the decoded control information as per a code division multiplexing scheme to generate reconstructed spread information;
  subtracting the reconstructed spread information from the transformed complex valued sample stream to generate a frequency domain data information sequence;
  performing an inverse discrete-Fourier transform on the frequency domain data information sequence to generate a time domain data sequence; and
  decoding the time domain data sequence to generate decoded data information.

2. The method of claim 1, wherein decoding includes code de-spreading the control information using a plurality of spreading codes corresponding to a plurality of user equipments that transmitted the control information.

3. The method of claim 1 wherein the code dispreading includes using a code having zero autocorrelation in the time domain.

4. The method of claim 1 further comprising:
  reconstructing decoded data information to generate reconstructed data information;
  subtracting the reconstructed data information from the transformed complex valued sample stream prior to the decoding the control information.

5. The method of claim 1 wherein the decoding the time domain data sequence to generate decoded data information does not include code despreading the time domain data sequence.

* * * * *